Dec. 7, 1965      J. W. WILKINSON      3,221,880
OIL FILTER WITH RELIEF VALVE
Original Filed March 18, 1959      2 Sheets-Sheet 1

FIG-1-

INVENTOR
JAMES W. WILKINSON
BY Munson H. Lane
ATTORNEY

Dec. 7, 1965     J. W. WILKINSON     3,221,880
OIL FILTER WITH RELIEF VALVE
Original Filed March 18, 1959     2 Sheets-Sheet 2

INVENTOR
JAMES W. WILKINSON
BY *Munson H. Lane*
ATTORNEY

United States Patent Office 3,221,880
Patented Dec. 7, 1965

3,221,880
OIL FILTER WITH RELIEF VALVE
James W. Wilkinson, Hastings, Mich., assignor to Hastings Manufacturing Company, Hastings, Mich., a corporation of Michigan
Original application Mar. 18, 1959, Ser. No. 800,271. Divided and this application Apr. 14, 1964, Ser. No. 359,632
11 Claims. (Cl. 210—130)

The present application is a division of my application Serial No. 800,271, filed Mar. 18, 1959.

The invention relates to filters particularly adapted for the filtering of lubricating oil of internal combustion engines which is translated through the filter under substantial pressure. The main objects of this invention are:

First, to provide a filter adapted for use in filtering oil of internal combustion engines and the like having a disposable valved filter proper or filter cartridge including as a unitary part thereof an improved safety valve which permits bypassing flow of the lubricant in the event that the filter becomes clogged or otherwise in such condition as to prevent the desired flow lubricant therethrough;

Second, to provide a compact disposable filter cartridge and pressure relief valve assembly, which assembly is adapted for use in connection with commercially used types of filter housings or casings;

Third, to provide a disposable filter cartridge and improved relief valve assembly which is very compact and inexpensive, enabling its use in filter casings of widely used types; and Fourth, to provide a filter cartridge having these advantages which is very economical in its parts and which does not require technical skill in installing.

Objects relating to details and economies of the invention will appear from the description to follow.

A preferred embodiment of the invention is illustrated in the accompanying drawing, in which.

Figure 1:
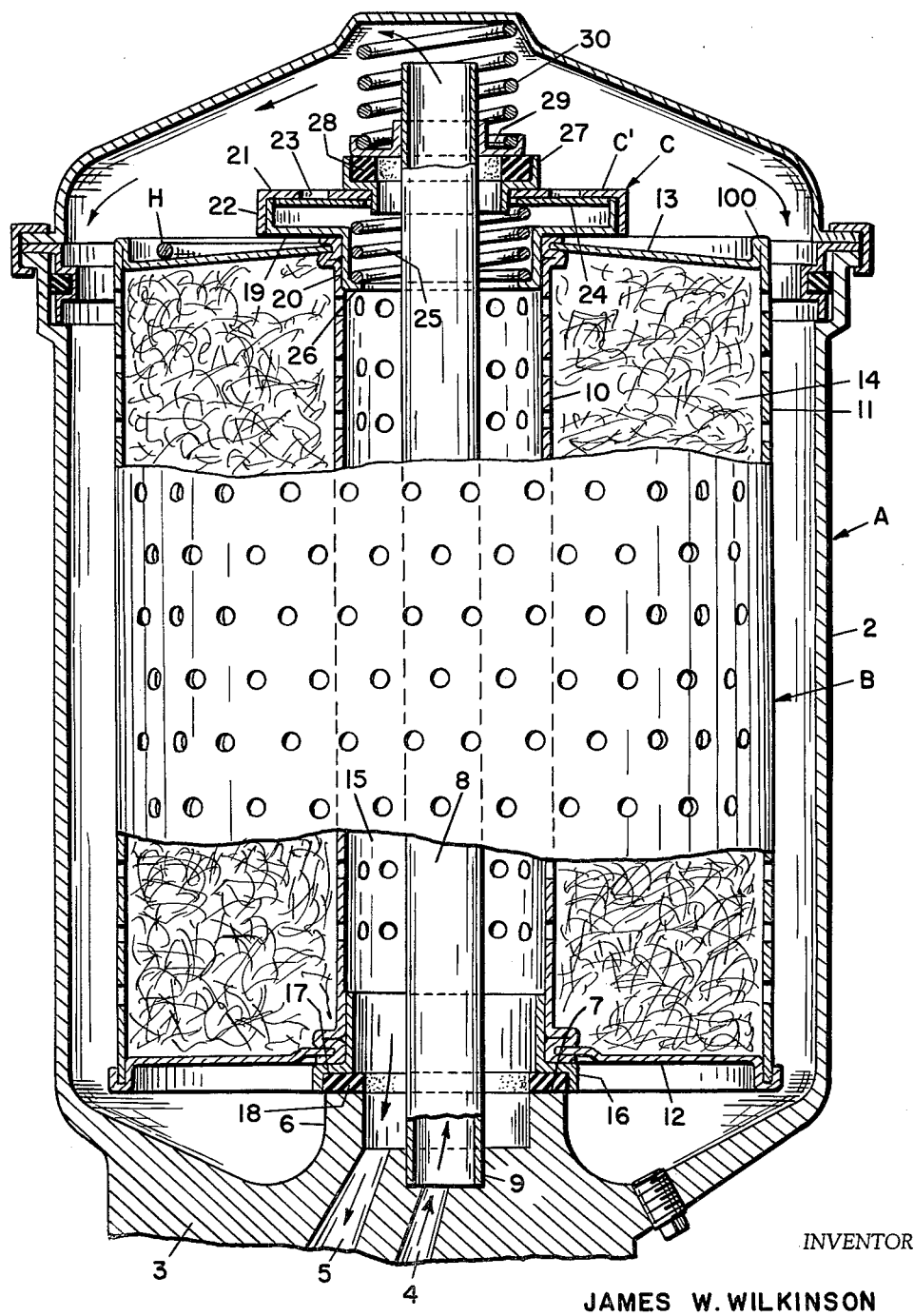
FIG. 1 is a fragmentary view partially in vertical section of a filter embodying my invention.
Figure 2:
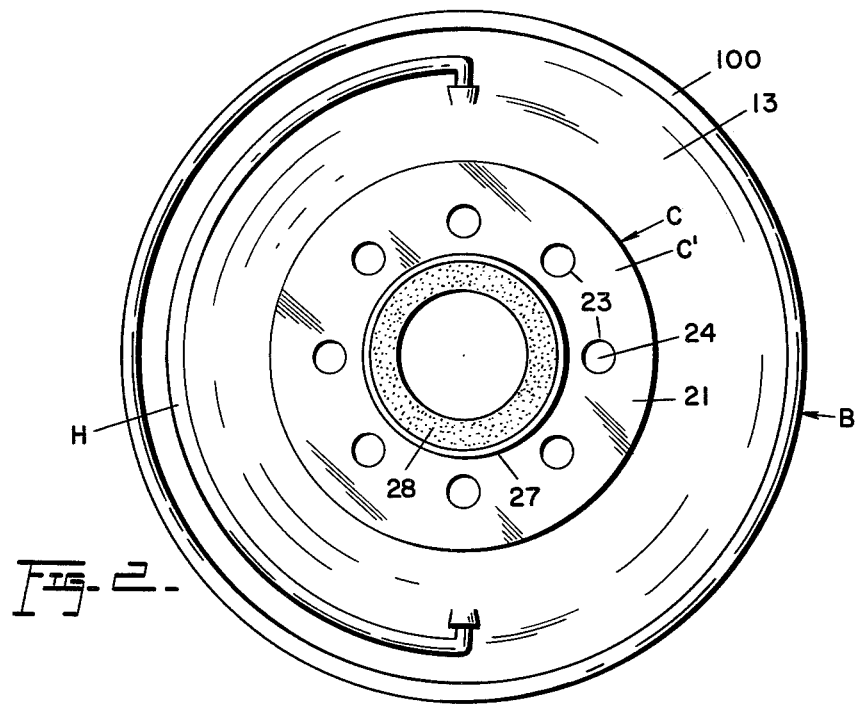
FIG. 2 is a plan view of the filter cartridge unit removed from the casing.
Figure 4:
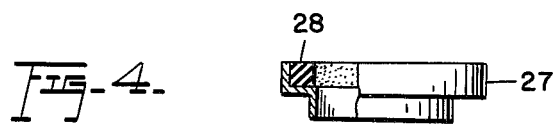
FIG. 4 is a side elevational view partly in section of the discharge passage seal member, which fits into and forms part of the relief valve member of FIG. 3.

In the embodiment illustrated in the accompanying drawing the filter casing designated generally by the letter A is substantially that of my Patent No. 2,855,104, issued October 7, 1958, and it comprises the body member 2 having an integral bottom 3 provided with an axially disposed inlet passage 4 and outlet passage 5 laterally spaced from the inlet 4. These passages are surrounded by the upwardly projecting annular member 6 having an upwardly facing seat 7 on its upper edge. An imperforate inlet tube 8 is seated in a socket or enlargement 9 at the upper end of the inlet 4 and may be considered part of the casing as distinguished from the disposable cartridge B.

I have not illustrated the pipe connections for the lubricant to be filtered, as such connections form no part of this invention, but it will be understood that the oil or other material filtered is commonly circulated under a substantial pressure necessary or deemed desirable for circulating the fluid through the lubricated parts.

The filter cartridge B of the embodiment illustrated comprises an inner foraminate wall or perforated tube 10 and an outer foraminate wall 11 arranged in spaced concentric relation to the inner wall, the inner and outer foraminate walls 10 and 11 being connected by imperforate end walls comprising a bottom wall 12 and a top wall 13 providing a chamber for the filtering material 14, which material is desirably cotton linters packed to uniform density, as is disclosed in my Letters Patent No. 2,797,811, issued July 2, 1957. When assembled, the inner filter wall or tube 10 of the cartridge B is spaced from the inlet tube 8 of casing A to provide a discharge passage 15 receiving the filtered material from the perforated inner filter wall 10. The inlet tube 8 discharges into the top of the casing above the filter and under normal conditions the discharged oil passes through the perforated outer wall 11, filtering material 14 and inner wall or tube 10 to the discharge passage 5.

The filter cartridge B is provided at its lower end with a holder 16 telescoped in the lower end of the inner filter wall or perforated tube 10 and is provided with a downwardly facing seat 17 for an annular gasket 18, the gasket 18 coacting with the seat 7 surrounding the recess 6 in the bottom of the casing A.

Figure 3:
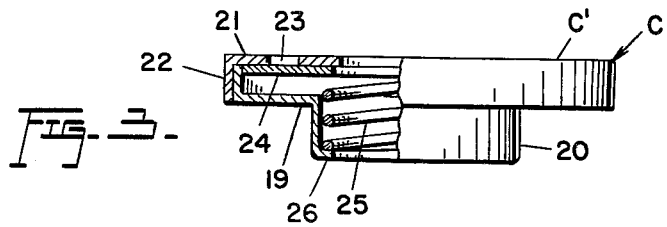
FIG. 3 is a side elevational view partly in section of the relief valve forming part of the filter cartridge.

A pressure relief valve C in accordance with my invention forms a unitary part of the cartridge and comprises a relatively thin compact valve casing C' including a lower casing member 19 having a sleeve portion 20 projecting therefrom and snugly and fittingly supported within the upper end of the inner wall of the filter. The outer end face of the valve casing C' comprises a valve seat member 21 and is provided with a downwardly projecting flange 22 fittingly engaging the upturned flange on the lower valve casing member 19. This valve seat member 21 is annular in form and is provided with a series of spaced fluid inlets 23 in the top thereof. The valve proper 24 is also annular in form and seats against the valve seat member 21 as is illustrated in FIGS. 1 and 3 and is yieldingly urged against its seat by the coil spring 25 seated on the inturned flange 26 of the sleeve portion 20 which is mounted within the end of the perforated tube 10. This spring has a predetermined tension; that is, it yields under certain predetermined pressure or thrust on the valve.

As shown in FIG. 1, the upper end of the discharge passage 15 between the perforated tube 10 and the imperforate inlet tube 8 is yieldingly closed, the valve seat member 21 of the valve casing C' being provided with an upwardly facing gasket seat member 27 for a gasket 28, and a discharge passage closure 29 is shown as vertically reciprocable upon the tube 10 and is urged upon the seat 27 and gasket 28 by the spring 30.

With this arrangement, when the pressure within the filter casing A reaches a predetermined point relief valve C opens allowing the oil or other filtered liquid to bypass the filter and to discharge through the valve C and passage 15 direct to the casing outlet 5.

As will be apparent from the above description the valve C is of very compact and practical construction, and is particularly suitable for use with commercial types of filters and filter cartridges, particularly the filter casing of my prior Patent No. 2,855,104, and with the cartridge of my Patent No. 2,797,811. The valve is of such economical construction that it may be thrown away with the cartridge, and is so dependable in operation that it is as effective as more expensive types of relief valves which in other assemblies are retained with the casing but require considerable time for assembly when the cartridge is replaced.

As is apparent, the extension sleeve 20 of the valve C is of less diameter than the diameter of the valve casing C' and accordingly is adapted to snugly fit within the end of the perforated tube or wall 10 of the cartridge B, while the valve casing C' projects laterally therefrom.

The valve casing C' being of relatively large diameter, but relatively thin axially, is adapted to house the reciprocable valve member 22, while the coil spring member 25 is principally housed within the stem or sleeve portion 20, which is preferably of greater length than the thickness of the valve casing as measured by the space between the lower and upper casing members 19 and 21 of the valve casing. Also, while the valve casing is of greater diameter than the sleeve 20 and perforated tube 11 it is of less diameter than the diameter of the outer wall 11 of the filter cartridge, leaving space between it and the outer wall, which space may be used for mounting a cartridge carrier handle H such as is shown in my Patent No. 2,797,811 and/or for advertising or other data.

Additionally, by reason of the relative thinness of the valve casing C' it need not protrude far above the outer rim or bead 100 of the filter cartridge B, and indeed may be made sufficiently thin to be completely protected by said rim. Also the thinness of the valve casing C' is desirable from the standpoint of the operation of the valve member itself, as the lower face of the casing serves as a positive lower limit or stop for the valve member 22. Other advantages of my membership devices will be apparent to those skilled in the art.

What is claimed is:

1. In a disposable filter cartridge including coaxial outer and inner pervious cylindrical walls, said outer and inner walls providing a filtering chamber, filtering material within said chamber, and impervious end walls closing said chamber, said inner cylindrical wall comprising a tube open at one end to permit discharge of fluid from the cartridge; a relief valve member mounted at the end of said cartridge opposite the discharge end and forming a unitary part thereof, comprising an annular valve casing member and a sleeve projecting axially from said casing member snugly fitting within an end of said inner pervious wall, said valve casing member being flanged radially outwardly from said sleeve member, and having openings in its outer end face, an annular valve member mounted in said casing and axially reciprocable therein, and spring means housed principally in said sleeve member and normally urging said annular valve member outwardly to close said casing openings, said annular valve member being relatively thin as compared with the distance between the top and bottom portions of said valve casing, and the space between said top and bottom portions being relatively unobstructed, said top and bottom portions serving as upper and lower limits for the movement of said reciprocable valve member, the valve casing member and sleeve of said relief valve member being formed of relatively thin sheet material, said valve casing member comprising annular inner and outer end walls, the inner end wall projecting radially outwardly from said sleeve externally of and adjacent to but separate from the corresponding end wall of the casing and terminating short of the casing outer wall, and said sleeve member having an inturned end portion to provide a stop for one end of the valve spring means.

2. A disposable valved filter cartridge unit comprising a foraminous cylindrical outer wall, an inner foraminous wall portion spaced from the outer wall, said inner cylindrical wall comprising a tube open at one end to permit discharge of fluid from the cartridge, fibrous filtering material occupying the space between the perforated inner and outer walls and imperforate annular top and bottom walls closing the filter compartment of said cartridge and compact pressure relief valve means mounted at the end of said inner foraminous wall at the discharge end and forming a unitary part of the cartridge, comprising an annular valve casing portion of greater outside diameter than the inner foraminous wall but of less diameter than the outer wall of the cartridge leaving a substantial annular space between the valve casing and the outer wall, said valve casing being of relatively small thickness as compared with its diameter so that the valve casing projects only a short distance axially beyond the cartridge proper, and a sleeve member of reduced diameter as compared with the diameter of the valve casing and projecting from the casing a substantial distance into the end of the foraminous wall portion, said valve casing having spaced apertures in the outer end face thereof, an annular valve member housed in said valve casing and axially reciprocable therein and spring means normally urging said valve to closed position against said valve casing openings, said spring being principally housed in said sleeve portion projecting into the inner wall portion, said annular valve member being relatively thin as compared with the distance between the top and bottom portions of said valve casing, and the space between said top and bottom portions being relatively unobstructed, said top and bottom portions serving as upper and lower limits for the movement of said reciprocable valve member, the valve casing member and sleeve of said relief valve member being formed of relatively thin sheet material, said valve casing member comprising annular inner and outer end walls, the inner end wall projecting radially outwardly from said sleeve externally of and adjacent to but separate from the corresponding end wall of the casing and terminating short of the casing outer wall, and said sleeve member having an inturned end portion to provide a stop for one end of the valve spring means.

3. A disposable valved filter cartridge unit comprising a foraminous cylindrical outer wall and an inner foraminous cylindrical wall portion spaced from the outer wall to form a filter compartment, said inner cylindrical wall comprising a tube open at one end to permit discharge of fluid from the cartridge, filtering material occupying the space between the perforated inner and outer walls and imperforate annular end walls closing the filter compartment of said cartridge and compact pressure relief valve means mounted at the end of said inner foraminous wall opposite the discharge end and forming a unitary part of the cartridge comprising an annular valve casing of greater outside diameter than the inner foraminous wall but of less diameter than the outer wall of the cartridge leaving a substantial annular space between the valve casing and the outer wall, said valve casing being of relatively small thickness as compared with its diameter so that the valve casing projects outwardly only a short distance beyond the end wall of the cartridge and a sleeve member of reduced diameter as compared with the diameter of the valve casing, projecting from the valve casing a substantial distance into the end of the inner foraminous wall portion, said valve casing having spaced apertures in the outer end face thereof, an annular valve member housed in said valve and axially reciprocable therein and spring means normally urging said valve to closed position against said casing openings, said spring being principally housed in said sleeve portion projecting into the inner wall portion, said sleeve member being of greater length than the thickness of said valve casing member, said annular valve member being relatively thin as compared with the distance between the top and bottom portions of said valve casing, and the space between said top and bottom portions being relatively unobstructed, said top and bottom portions serving as upper and lower limits for the movement of said reciprocable valve member, the valve casing member and sleeve of said relief valve member being formed of relatively thin sheet material, said valve casing member comprising annular inner and outer end walls, the inner end wall projecting radially outwardly from said sleeve externally of and adjacent to but separate from the corresponding end wall of the casing and terminating short of the casing outer wall, and said sleeve member having an inturned end portion to provide a stop for one end of the valve spring means.

4. In a disposable filter cartridge including coaxial outer and inner pervious cylindrical walls providing a filtering chamber having filtering material therein, and impervious annular end wall members closing the ends of said chamber, said inner cylindrical wall comprising a tube open at one end to permit discharge of fluid from the cartridge; a relief valve assembly mounted at the end of said cartridge opposite said discharge end and forming a unitary part thereof, comprising an annular valve casing having a sleeve projecting axially therefrom and snugly fitting within an end of said inner pervious wall, said casing member having an imperforate peripheral wall, an imperforate inner end wall separate from the adjacent cartridge end wall and an outer end wall having end openings therein, said valve casing member being flanged radially outwardly from said sleeve member and being of relatively small thickness as compared with its diameter so that the valve casing projects only a short distance axially beyond the end wall of the cartridge proper, an annular valve housed in said casing and axially reciprocable therein, and means comprising a coil spring normally urging said valve to closed position against said end openings, said coil spring being principally housed in the sleeve portion of the wall casing which projects into the inner wall portion of the cartridge, said annular valve member being relatively thin as compared to the distance between the top and bottom end wall portions of said valve casing member whereby to permit axial movement of the valve member.

5. A disposable filter cartridge as set forth in claim 4, wherein the end of the inner cylindrical wall in which the axially projecting sleeve of the valve casing member fits is of uniform diameter and is contacted by the sleeve throughout its length, whereby a snug fit is insured and accidental removal of the valve avoided.

6. In a disposable filter cartridge including coaxial outer and inner pervious cylindrical walls providing a filtering chamber having filtering material therein, and impervious annular end wall members closing the ends of said chamber, said cylindrical wall comprising a tube open at one end to permit discharge of fluid from the cartridge; a relief valve assembly mounted at the end of said cartridge opposite said discharge end and forming a unitary part thereof, comprising an annular valve casing having a sleeve projecting axially therefrom and snugly fitting within an end of said inner pervious wall, said casing member having an imperforate peripheral wall, an imperforate inner end wall separate from the adjacent cartridge end wall and an outer end wall having end openings therein, said valve casing member being flanged radially outwardly from said sleeve member and being of relatively small thickness as compared with its diameter so that the valve casing projects only a short distance axially beyond the end wall of the cartridge proper, an annular valve housed in said casing and axially reciprocable therein, and means comprising a coil spring normally urging said valve to closed position against said end openings, said coil spring being principally housed in the sleeve portion of the wall casing which projects into the inner wall portion of the cartridge, said annular valve member being relatively thin as compared to the distance between the top and bottom end wall portions of said valve casing member whereby to permit axial movement of the valve member, said valve casing being provided with an axial end opening opposite said sleeve, an annular seal retainer member coaxial with said valve casing, having an axial sleeve of reduced diameter snugly fitting said axial end opening in the valve casing and projecting into the interior of said valve casing to provide a centering element for said valve spring means and a sealing gasket mounted on said seal retainer and facing outwardly therefrom.

7. In a filter for a pressure circulated medium, the combination of a casing including a bottom having an inlet opening and a discharge opening therein, an inlet tube mounted on said casing bottom in communication with said inlet opening thereof and discharging at the outer end of said casing; a filter cartridge supportedly seated on said bottom and surrounding and removably associated with said inlet tube and comprising inner and outer and top and bottom walls, the inner and outer walls being foraminate, said cartridge containing a compacted fibrous filtering medium, there being a discharge passage between said inlet tube and said inner cartridge wall opening to said discharge passage in said casing, said inlet tube projecting above and discharging into said casing above said cartridge, and a pressure relief valve comprising a valve casing supportedly mounted on the upper end of said cartridge and having a downwardly projecting portion projecting into and retainingly engaged with the upper end of said inner cartridge wall, said valve casing including an inwardly facing valve seat having an inlet opening to said casing and discharging into said discharge passage, an annular disk valve disposed in said valve casing in coacting relation to said valve seat, and a coil spring supportedly disposed within said valve casing in coacting relation to said valve and tensioned to hold said valve on its seat only under such pressure as is required for passing a substantial portion of circulated medium through the filtering material within the cartridge.

8. In a filter for a pressure circulated medium, the combination of a casing including an inner end having an inlet opening and a discharge opening therein, an inlet tube mounted on said inner end of said casing in communication with said inlet opening thereof and discharging at the outer end of the casing, a filter cartridge containing a fibrous filtering material sealingly seated on said inner end of said casing and removably associated with said inlet tube and comprising a tubular inner wall spaced outwardly from said inlet tube and coacting therewith to define a discharge passage having outlet openings therein for the filtered medium which passes through the filtering material, said inlet tube discharging into said casing at the outside of said cartridge, a pressure actuated filtering material bypass valve casing supportedly mounted on said cartridge and including an inwardly facing valve seat having a casing discharge opening therein, a valve disposed in said valve casing in coacting relation with said valve seat, and means disposed within said valve casing in coacting relation to said valve and acting to hold the valve on its seat under such pressure as is normally required for passing a substantial portion of the circulated medium under presssure through the filtering material within the cartridge but opening when the pressure of the circulated medium in said casing at the outer side of the cartridge exceeds such degree.

9. In a filter for a pressure circulated medium, the combination of a casing including an inner end having an inlet opening and a discharge opening therein, an inlet tube mounted on said inner end of said casing in communication with said inlet opening thereof and discharging at the outer end of the casing, a filter cartridge containing a fibrous filtering material sealingly seated on said inner end of said casing and removably associated with said inlet tube and comprising an inner wall spaced from said inlet tube and coacting therewith to define a discharge passage having outlet openings therein for the filtered medium passing through the filter, said inlet tube discharging into said casing at the outer side of said cartridge, and a pressure actuated filtering material bypass valve supportedly mounted on said cartridge at one end of its said inner wall, and including means acting to hold the valve on its seat under such pressure as is required for passing a substantial portion of the circulated medium under pressure through the filtering material within the cartridge but permitting the opening of said valve when the pressure of the circulated medium in said casing at the outer side of the cartridge substantially exceeds such degree.

10. In a filter for a pressure circulated medium, the combination of a casing including an inner end having an inlet opening and discharge opening therein and having an outwardly facing cartridge seat surrounding both of said openings, an inlet tube mounted on said inner end of said casing in communication with said inlet openings thereof and discharging at the outer end of said casing, a filter cartridge containing filtering material seated on said cartridge seat at the inner end of said casing and removably associated with said inlet tube and including an inner wall coacting with said tube to define a discharge passage for the filter and a filtering material bypass means comprising a valve casing supportedly mounted on said cartridge at one end thereof to discharge within said inner wall of said cartridge at one end thereof opening to said casing, a pressure actuated valve disposed within said valve casing, and means coacting with said valve to ho'd it on its seat under such pressure as is normally required for the passing of the circulated medium through the filtering material within the cartridge but which permits the valve to open when the pressure of the circulated medium within the casing at the outside of said cartridge exceeds a predetermined degree.

11. In a filter for a pressure circulated medium, the combination of a casing including an inner end having an inlet opening and discharge opening therein and having an upwardly facing cartridge seat surrounding said openings, an inlet tube mounted on said inner end of said casing in communication with said inlet openings thereof and discharging at the outer end of said casing, a filter cartridge containing filtering material seated on said cartridge seat at the inner end of said casing and removably associated with said inlet tube and including an inner wall coacting with said tube to define a discharge passage for the filter, said inner cartridge wall having a valve casing supportedly connected to one end thereof, a pressure actuated valve disposed within said valve casing and opening to said casing at the outside of said filter cartridge, and means coacting with said valve to hold it on its seat under such pressure as is normally required for the passing of circulated medium through the filtering material within the cartridge but which permits the valve to open when the pressure of the circulated medium within the casing exceeds a predetermined degree.

References Cited by the Examiner

UNITED STATES PATENTS

| | | | |
|---|---|---|---|
| 1,359,006 | 11/1920 | Wardell | 137—516.15 |
| 2,020,508 | 11/1935 | Knapp | 137—543.17 X |
| 2,076,935 | 4/1937 | Burckhalter. | |
| 2,533,266 | 12/1950 | Kovacs | 210—130 |
| 2,569,176 | 9/1951 | Katcher | 137—543.21 |
| 2,598,322 | 5/1952 | Vokes | 210—130 |
| 2,639,783 | 5/1953 | Kovacs | 210—437 X |
| 2,734,636 | 2/1956 | Foster | 210—130 |
| 2,855,103 | 10/1958 | Wilkinson | 210—315 |

FOREIGN PATENTS 601,066   4/1948   Great Britain.

REUBEN FRIEDMAN, *Primary Examiner.*